US006368363B1

(12) United States Patent
Kobatake et al.

(10) Patent No.: US 6,368,363 B1
(45) Date of Patent: Apr. 9, 2002

(54) METHOD OF MASS PRODUCING SOLID ELECTROLYTIC CAPACITORS AND APPARATUS FOR MAKING THE SAME

(75) Inventors: Yasuhiro Kobatake, Osaka; Kenji Kuranuki, Kyoto; Yukari Shimamoto, Kyoto; Hiromichi Yamamoto, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/505,307

(22) Filed: Feb. 16, 2000

(30) Foreign Application Priority Data

Feb. 17, 1999 (JP) ............................. 11-038346

(51) Int. Cl.$^7$ ............................. H01G 9/00; H01G 9/02; H01G 5/38; B23P 19/00
(52) U.S. Cl. ..................... 29/25.03; 29/730; 361/311; 361/500; 361/523; 361/525; 361/539; 361/541
(58) Field of Search ............................. 29/25.01–25.03, 29/730, 729; 361/500, 311, 523–525, 541, 539

(56) References Cited

U.S. PATENT DOCUMENTS

| 4,085,435 A | 4/1978 | Galvagni ..................... 361/535 |
| 4,110,815 A | 8/1978 | Frade et al. ................. 361/524 |
| 4,785,380 A | 11/1988 | Harakawa et al. ........... 361/527 |
| 4,805,074 A | 2/1989 | Harakawa et al. ........... 361/525 |
| 4,934,033 A | 6/1990 | Harakawa et al. ......... 29/25.03 |
| 5,198,967 A * | 3/1993 | Kuranuki et al. ............ 361/523 |
| 5,428,500 A | 6/1995 | Nishiyama et al. .......... 361/525 |
| 5,432,029 A | 7/1995 | Mitate et al. ................ 429/338 |
| 5,443,602 A | 8/1995 | Kejha ........................... 29/730 |
| 5,473,503 A | 12/1995 | Sakata et al. ................ 361/525 |

FOREIGN PATENT DOCUMENTS

| JP | 59-23889 | 2/1984 |
| JP | 60-137923 | 7/1985 |
| JP | 62-165313 | 7/1987 |
| JP | 63-158829 | 7/1988 |
| JP | 3-23614 A * | 1/1991 |

* cited by examiner

Primary Examiner—Ha Tran Nguyan
(74) Attorney, Agent, or Firm—Ratner & Prestia

(57) ABSTRACT

A simple method of mass producing a plurality of solid electrolytic capacitor elopements can be performed to produce capacitors with reduced leakage current and excellent reliability. The method includes supplying a band metal, a first portion of which contains protrusions on which a dielectric layer, then a conductor layer are formed. A conductive polymer film is formed on the conductor layer by electrolytic polymerization starting from a conductive tape adhered on a second portion of the band metal. The conductive tape acts as a common positive electrode for polymerization and a plurality of electrodes connected independently to the protrusions as negative electrodes. Finally a plurality of capacitor elements are formed by laminating individual protrusions cut off from the band metal.

28 Claims, 7 Drawing Sheets

A step of opening continuous holes at specified intervals, in the longitudinal direction of a continuous band anode foil made of valve metal.

A step of separating the band anode foil, so that the end part side in the width direction may be a cathode lead-out part and that the central part side may be an anode lead-out part, by adhering an electric insulating tape to face and back sides of the anode foil so as to cover the holes.

A step of forming a plurality of protrusions continuously by disposing slits at specified intervals in the end part of the cathode lead-out part.

A step of forming an anodic forming film as a dielectric on the surface of the anode foil.

A step of adhering a conductor on the anodic forming film of the cathode lead-out part uniformly in at least one of insular state and layer state.

A step of forming a conductive high polymer film in the cathode lead-out part through the conductor layer, by adhering a conductive tape on the insulating tape, and performing electrolytic polymerization by starting polymerization from the conductive tape.

A step of fabricating individual flat capacitor elements, by peeling off the conductive tape and cutting off the band anode foil into individual pieces.

A step of laminating a plurality of the flat capacitor elements at specified positions of each terminal of a plurality of terminals provided at equal intervals in a band metal lead frame, and connecting the individual capacitor elements to the terminals electrically.

A step of covering the plurality of capacitor elements integrally with an external resin so that part of the terminals may be exposed outside.

A step of cutting off the covered elements into individual pieces and separating from the metal lead frame.

FIG. 9

METHOD OF MASS PRODUCING SOLID ELECTROLYTIC CAPACITORS AND APPARATUS FOR MAKING THE SAME

TECHNICAL FIELD OF THE INVENTION

The present invention relates to a method of manufacturing a solid electrolytic capacitor having a high polymer solid electrolyte, and an apparatus of manufacturing the same.

BACKGROUND OF THE INVENTION

In the recent trend of higher frequency in power source circuits of electronic appliances, electrolytic capacitors used in such electronic appliances are demanded to have an excellent high frequency characteristic. To meet this demand, in order to realize low impedance in high frequency region, a solid electrolytic capacitor using conductive high polymer having a high conductivity obtained by electrolytic polymerization as solid electrolyte is being proposed.

In a method of manufacturing a solid electrolytic capacitor using conductive high polymer as solid electrolyte, as a method of forming a conductive high polymer film on an anodic forming film (dielectric) having an electric insulator, it is proposed to develop a method of forming a conductive high polymer film comprising a step of forming a metal oxide (for example, manganese dioxide) formed on an anodic forming film or a conductive high polymer film (for example, conductive high polymer film having pyrrole chemically oxidized by ammonium persulfate) formed by chemical oxidation polymerization as a conductive layer, and a step of feeding current to this conductive layer to perform electrolytic polymerization.

However, in order to form a high polymer film by electrolytic polymerization simultaneously in the individual capacitor elements of a plurality of capacitor elements, the following method is required. That is, as shown in FIG. 10, in an electrolytic solution 6 containing monomer such as pyrrole and support electrolyte (hereinafter called polymerization solution), each anode electrode 8 having a valve metal and each current feeding electrode 9 (hereinafter called polymerization electrode) contact with each other. Using this polymerization electrode 9 as the positive electrode, voltage is applied between the polymerization electrode 9 and cathode 10, and electrolytic polymerization is performed. In this case, the polymerization electrode 9 contacts directly with the conductive layer on the anodic forming film of the anode electrode 8 of valve metal.

However, the conventional manufacturing method of solid electrolytic capacitor requires complicated steps such as a step of preparing one polymerization electrode 9 for one capacitor element, and a step of contacting between one polymerization electrode and one anode electrode 8 of valve metal. It is hence difficult to mass-produce efficiently.

Besides, when the polymerization electrode 9 contacts with the conductive layer on the anodic forming film of the anode electrode 8, the anodic forming film may be injured to cause a defective part. This defective part may contact with the conductive high polymer film used as the cathode. Accordingly, the product manufactured by this method may have a large leak current and a low withstand voltage. In the conventional method, hence, it was difficult to obtain a capacitor element for realizing a solid electrolytic capacitor of high reliability.

Yet, when assembling a solid electrolytic capacitor by using a capacitor element manufactured by this conventional method, it is required to join independent terminal members (not shown) individually to the anode and cathode (not shown) formed on the capacitor element, and cover with external resin (not shown). It hence involves many problems in the assembling precision and the number of assembling steps.

It is therefore an object of the invention to present a method of manufacturing a solid electrolytic capacitor having excellent characteristics, superior reliability, and outstanding mass producibility, and an apparatus of manufacturing the same.

SUMMARY OF THE INVENTION

A manufacturing method of solid electrolytic capacitor of the invention comprises:

(a) a step of supplying a band metal having a central part in the width direction and a plurality of protrusions formed at an end part in the width direction, (b) a step of forming a dielectric layer on the surface of the plurality of protrusions, (c) a step of adhering a conductive tape to the central part, (d) a step of forming a conductive high polymer film above the plurality of protrusions, by performing electrolytic polymerization by starting polymerization from the conductive tape, (e) a step of peeling the conductive tape from the metal, and (f) a step of fabricating a plurality of capacitor elements by cutting off individual protrusions from the plurality of protrusions, from the band metal forming the conductive high polymer film.

Preferably, the invention further comprises:

(g) a step of placing a conductor layer above the dielectric layer, in which the conductive high polymer film is formed on the conductor layer.

Preferably, the step of forming the conductive high polymer film includes a step of polymerizing the conductive high polymer film on the conductor layer electrolytically, by using the conductive tape as a common positive electrode, and using electrodes connected to the individual power sources as individual independent negative electrodes.

Preferably, the invention includes at least one of the following steps:

(h) a step of laminating each capacitor element of the plurality of capacitor elements at a specified position of a band metal lead frame having a plurality of pairs of terminal parts, (i) a step of connecting each pair of terminals of the plurality of pairs of terminals electrically to the anode lead-out part and cathode lead-out part respectively, (j) a step of covering the laminated capacitor elements with an external resin, and (k) a step of fabricating individual solid electrolytic capacitors by cutting off the pair of terminal parts having the covered capacitor elements, from the metal lead frame.

Preferably, the step of supplying the band metal includes a step of adhering an electric insulating tape to the central part, forming an anode lead-out part at the central part side, and forming a cathode lead-out part on the protrusions, the anode lead-out part and cathode lead-out part are electrically insulated by the electric insulating tape, the conductive tape is adhered on the electric insulating tape, and the conductive high polymer film is formed on the cathode lead-out part.

A manufacturing apparatus of solid electrolytic capacitor of the invention comprises:

(a) a band metal supply unit for supplying a band metal having a central part, and a plurality of protrusions formed at least at one side edge of both side edges positioned at both sides of the central part, (b) a dielectric forming unit for forming a dielectric layer on the surface of the plurality of protrusions, (c) a conductor forming unit for forming a conductor layer on the dielectric layer, (d) a conductive tape adhering unit for adhering a conductive tape to the central part, (e) an electrolytic polymerization unit for forming a conductive high polymer film above the plurality of conductive layers, by performing electrolytic polymerization by starting polymerization from the conductive tape, (f) a conductive tape peeling unit for peeling the conductive tape from the metal, and (g) an element cutting unit for fabricating a plurality of capacitor elements, by cutting off individual protrusions from the plurality of protrusions, from the band metal forming the conductive high polymer film.

Preferably, the band metal supply unit includes a slit forming unit for forming a plurality of protrusions by forming a plurality of slits at specified intervals in the end part in the width direction of the band metal.

Preferably, the invention comprises at least one element of the following constituent elements:

(h) a laminating unit for laminating individual capacitor elements of the plurality of capacitor elements at specified positions of a band metal lead frame having a plurality of pairs of terminal parts, (i) a connecting unit for connecting terminals of each pair of the plurality of pairs of terminals electrically to the capacitor elements, (j) a forming unit for covering the laminated capacitor elements with an external resin, and (k) a product dividing unit for fabricating individual solid electrolytic capacitors by cutting off the pair of terminal parts having the covered capacitor elements from the metal lead frame.

According to such manufacturing method and manufacturing apparatus, it is easy to work in the steps from forming treatment to electrolytic polymerization for manufacturing a plurality of capacitor elements continuously, and the mass producibility notably enhanced. Moreover, it prevents occurrence of defective part due to injury of the anode foil. Therefore, occurrence of defective part in the conductive high polymer film is prevented. As a result, the invention provides a capacitor element for solid electrolytic capacitor having excellent performances, such as a small leak current, high withstand voltage, and excellent reliability.

The process from the step of laminating a plurality of capacitor elements on a band metal lead frame forming and having terminals to the step of covering these laminated matters with an external resin can be done continuously by using the band metal lead frame. Accordingly, the solid electrolytic capacitor having an excellent assembling precision and a high reliability can be manufactured efficiently.

BRIEF DESCRIPTION OF THE DRAWINGS

FIG. 9 is a manufacturing process diagram in a manufacturing method of a solid electrolytic capacitor in an embodiment of the invention.

REFERENCE NUMERALS

Figure 1:
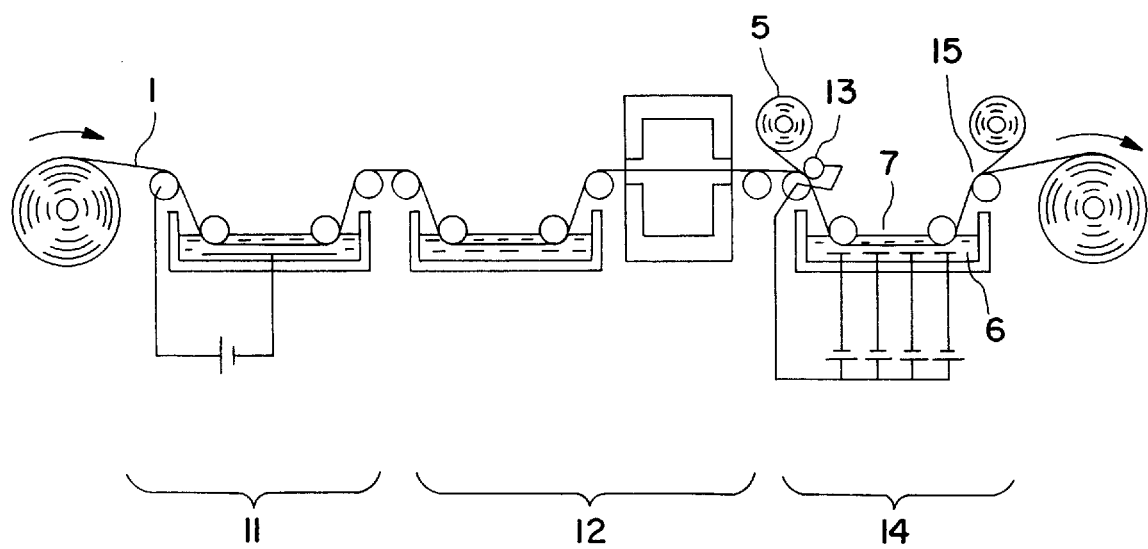
FIG. 1 is a conceptual diagram of a manufacturing apparatus showing a manufacturing method of a capacitor element in a manufacturing method of a solid electrolytic capacitor in an embodiment of the invention.

1 Anode foil
2 Insulating tape
3 Anode lead-out part
4 Cathode lead-out part
5 Conductive tape
6 Polymerization solution
7 Four independent cathodes
11 Forming treatment step
12 Conductor layer forming step
13 Conductive tape adhering step
14 Polymerization step
15 Conductive tape peeling step
16 Metal lead frame
17 Element mounting unit
18 Anode terminal
19 Cathode terminal
20 Solid electrolytic capacitor
23 Slit
24 Protrusion

DETAILED DESCRIPTION OF THE INVENTION

A process showing a manufacturing method of a solid electrolytic capacitor in an embodiment of the invention is shown in FIG. 9. In FIG. 9, the manufacturing method of solid electrolytic capacitor of the invention comprises:

(a) a step of opening continuous holes at specified intervals, in the longitudinal direction of a continuous band anode foil made of valve metal, (b) a subsequent step of separating the band anode foil, so that the end part side in the width direction may be a cathode lead-out part and that the central part side may be an anode lead-out part, by adhering an electric insulating tape to face and back sides of the anode foil so as to cover the holes, (c) a subsequent step of forming a plurality of protrusions continuously by disposing slits at specified intervals in the end part of the cathode lead-out part, (d) a subsequent step of forming an anodic forming film as a dielectric on the surface of the anode foil, (e) a subsequent step of adhering a conductor on the anodic forming film of the cathode lead-out part uniformly in at least one of insular state and layer state, (f) a subsequent step of forming a conductive high polymer film in the cathode lead-out part through the conductor layer, by adhering a conductive tape on the insulating tape, and performing electrolytic polymerization by starting polymerization from the conductive tape, (g) a subsequent step of fabricating individual flat capacitor elements, by peeling off the conductive tape and cutting off the band anode foil into individual pieces, (h) a subsequent step of laminating a plurality of the flat capacitor elements at specified positions of each terminal of a plurality of terminals provided at equal intervals in a band metal lead frame, and connecting the individual capacitor elements to the terminals electrically, (i) a subsequent step of covering the plurality of capacitor elements integrally with an external resin so that part of the terminals may be exposed outside, and (j) a subsequent step of cutting off the covered elements into individual pieces and separating from the metal lead frame.

In this constitution, it is easy to work in the steps from forming treatment to electrolytic polymerization for manufacturing a plurality of capacitor elements continuously, and the mass producibility notably enhanced.

Moreover, since electrolytic polymerization is performed by applying a voltage through the conductor layer, by starting polymerization from the conductive tape adhered adjacently without contacting with the cathode lead-out part, it prevents occurrence of defective part due to injury of the anode foil. Hence, contact of the conductive high polymer film as the cathode with the defective part is prevented. Therefore, occurrence of defective part in the conductive high polymer film is prevented. As a result, the invention provides a capacitor element for solid electrolytic capacitor having excellent performances, such as a small leak current, high withstand voltage, and excellent reliability.

Preferably, the step of forming the conductive film includes a step of forming the conductive high polymer film by electrolytic polymerization, by using the conductive tape as a common anode, and using a plurality of cathodes connected to independent power sources. In this constitution, in addition to the above actions, the potential at the time of electrolytic polymerization is uniformly applied to each cathode lead-out part. As a result, a conductive high polymer film having a uniform film is formed.

Preferably, the base material of the conductive tape is made of at least one metal free from anodic oxidation property selected from stainless steel and nickel, and the adhesive material has an adhesive agent which can be easily peeled from the adhered. In this constitution, the above effects are further enhanced.

Preferably, the conductive high polymer film includes a polymer having at least one selected from the group consisting of pyrrole, thiophene, furan, and their derivatives, as unit of repetition. In this constitution, the above effects are further enhanced.

A manufacturing apparatus of solid electrolytic capacitor in an embodiment of the invention comprises:

a drilling unit for opening a plurality of holes continuously at specified intervals in the longitudinal direction of a continuous band anode foil made of a valve metal, an insulating tape adhering unit for adhering an insulating tape to face and back sides of the anode foil so as to cover the plurality of holes, a slit forming unit for forming slits at specified intervals in the end part in the width direction of the anode foil, a forming treatment unit for forming an anodic oxide film by forming treatment, on a cut section of the anode foil produced by forming the slits, a conductor layer forming unit for forming a manganese dioxide layer by applying an aqueous solution of manganese nitrate on the end part of the anode foil after the forming treatment, and performing pyrolysis, a conductive tape adhering unit for adhering a conductive tape on an insulating tape of an anode foil after forming the conductor layer, a polymerization unit for forming a conductive high polymer film in the end part by immersing the anode foil to which the conductive tape is adhered in an polymerization solution, and polymerizing electrolytically, a conductive tape peeling unit for peeling the conductive tape from the anode foil after polymerization, an element dividing unit for obtaining flat capacitor elements by cutting off the anode foil from which the conductive tape is peeled into individual pieces, an element laminating unit for laminating and mounting a plurality of flat capacitor elements at specified positions of a plurality of terminals provided at equal intervals in the band metal lead frame, a connecting unit for connecting the electrode parts of the plurality of elements electrically to the terminals, a molding unit for covering the plurality of capacitor elements integrally with an external resin so that a part of the terminals may be exposed outside, and a product dividing unit for dividing the capacitor elements after molding into individual pieces.

In this constitution, a series of processes can be executed continuously. Hence, the productivity is extremely improved. Further, a solid electrolytic capacitor having an excellent assembling precision and a high reliability is obtained.

Preferably, in the polymerization electrode when performing electrolytic polymerization, the conductive tape adhered on the insulating tape of the anode foil is used as a common positive electrode, and a plurality of stainless steel plates disposed independently on the polymerization solution surface so as to correspond to the plurality of cathode lead-out portions are used as independent cathodes, and the polymerization unit is composed so as to apply a voltage between the positive electrode and negative electrodes. In this constitution, the potential is applied uniformly on the cathode lead-out parts at the time of electrolytic polymerization. As a result, a conductive high polymer film having a uniform film is formed.

Referring now to the drawings, exemplary embodiments of the invention are described below.

Exemplary Embodiment 1

FIG. 1 is a conceptual diagram of a manufacturing apparatus for manufacturing elements of a solid electrolytic capacitor according to an embodiment of the invention. FIG. 9 shows a manufacturing process of a solid electrolytic capacitor of the embodiment of the invention. The constitution of the manufacturing apparatus and the manufacturing method are not limited to these illustrated examples alone. In the following explanation of the series of manufacturing method, each process is described according to FIG. 1 and FIG. 9.

Figure 2:
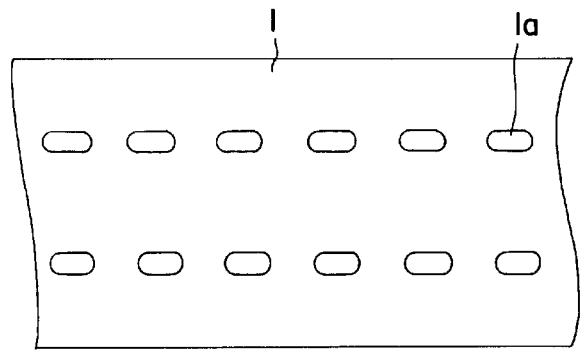
FIG. 2 is a plan view showing a state of opening holes in an anode foil in a manufacturing method of a solid electrolytic capacitor in an embodiment of the invention.

FIG. 2 shows a state of opening holes continuously at specified intervals in the longitudinal direction, in an anode foil 1 made from a valve metal. In the embodiment, two rows of holes 1a are formed in the width direction. The anode foil 1 is an aluminum foil (thickness 100 μm). The surface of the aluminum foil has an electrochemically roughened surface, and an anodic forming film formed by a forming voltage of 35 V is disposed on its surface.

Figure 3:
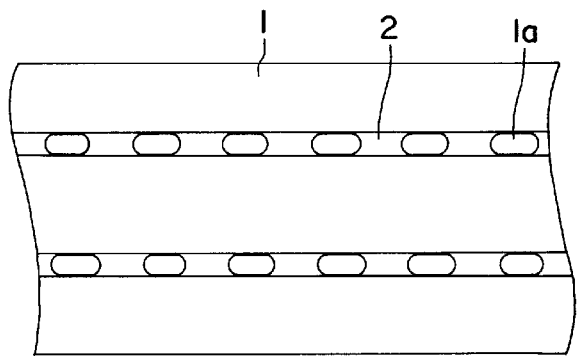
FIG. 3 is a plan view showing a state of adhering an electric insulating tape on an anode foil in a manufacturing method of a solid electrolytic capacitor in an embodiment of the invention.

FIG. 3 shows a state of adhering an electric insulating tape 2 so as to cover the holes 1a of the anode foil 1 in FIG. 2 from the face and back sides. By adhering this insulating tape 2 to the anode foil, it is separated into an anode lead-out part 3 and a cathode lead-out part 4 as described below.

Figure 4:
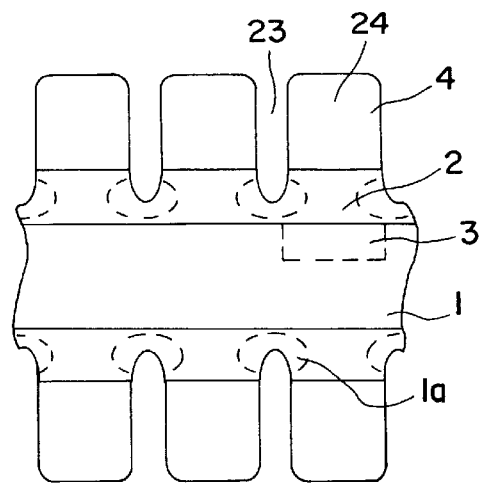
FIG. 4 is a plan view showing an anode foil before forming or other treatment of cut section, in a manufacturing method of a solid electrolytic capacitor in an embodiment of the invention.

As shown in FIG. 4, by forming slits at specified intervals in the end part in the width direction of the anode foil 1 to which the insulating tape 2 in FIG. 3 is adhered, individually independent cathode lead-out parts 4 are formed that is, the band anode foil 1 has a plurality of protrusions formed at both ends, and the plurality of protrusions have cathode lead-out parts 4. The cathode lead-out part 4 measures, for example, 3 mm×4 mm. As indicated by dotted line in FIG. 4, the anode lead-out parts 3 and cathode lead-out parts 4 which are finally divided into individual pieces are separated by an insulating tape 2.

Figure 5:
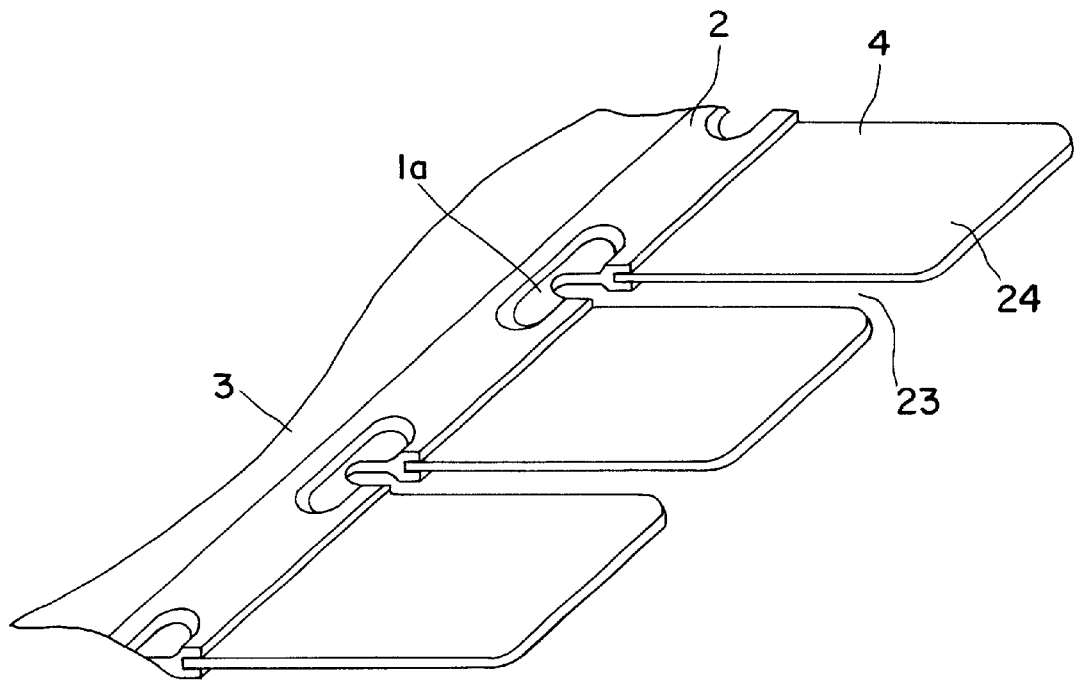
FIG. 5 is an essential perspective view showing cathode lead-out parts formed individually and independently, in a manufacturing method of a solid .electrolytic capacitor in an embodiment of the invention.

FIG. 5 is a magnified view of essential parts of the cathode lead-out parts 4 individually formed independently by forming such slits as mentioned above. As clear from FIG. 5, the insulating tape 2 adhered so as to cover the holes 1a formed in the anode foil 1 completely covers the holes 1a. Accordingly, in the manufacturing process of element mentioned later, it is effective to prevent the aqueous solution of manganese nitrate or polymerization solution from creeping up to the anode lead-out part 3 side.

Consequently, by forming treatment of the cut section of the anode foil 1 shown in FIG. 4, an anodic oxidation film was formed (forming treatment step 11 shown in FIG. 1).

In succession, the aqueous solution of manganese nitrate was applied on the cathode lead-out parts 4, and by pyrolysis for 5 minutes at 300° C., a manganese dioxide layer was formed as a conductor layer (conductor layer forming step 12 in FIG. 1).

Figure 6:
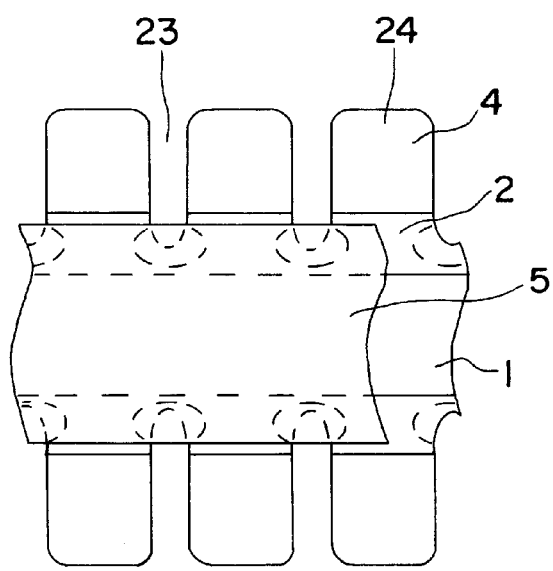
FIG. 6 is a plan view showing an anode foil to which a conductive tape is adhered, in a manufacturing method of a solid electrolytic capacitor in an embodiment of the invention.

On the anode foil 1 prepared in this manner, a conductive tape 5 was adhered as shown in FIG. 6 (conductive tape adhering step 13 in FIG. 1).

Further, the anode foils 1 to which the conductive tape 5 was adhered in the above preparation were sequentially immersed in the polymerization solution 6 (an aqueous solution of 0.2 mol/liter of pyrrole, and 0.1 mol/liter of alkyl naphthalene sulfonate). Using the conductive tape 5 as a common positive electrode, and using four stainless steel plates disposed on the liquid surface as four independent cathodes 7, a voltage was applied between the positive electrode and negative electrodes, and electrolytic polymerization was performed. A conductive high polymer film is formed on the entire surface of the cathode lead-out parts 4. In the period from putting the anode foils in the tank containing the polymerization solution until taking out, the polymerization started from the conductive tape 5, and a conductive high polymer film was formed on the entire surface of the cathode lead-out parts 4 in about 30 minutes (polymerization step 14 in FIG. 1).

Moreover, the anode foil forming the conductive high polymer film was taken out of the polymerization solution 6, and the adhering conductive tape 5 was peeled off (conductive tape peeling step 15 in FIG. 1).

In this way, a series of steps from forming treatment until polymerization was executed continuously as shown in FIG. 1. At this time, the sequential processing steps were carried out so that the rollers for conveying these samples might not contact with the cathode lead-out parts 4.

After forming the conductive high polymer film, a carbon paint layer and a silver paint layer were formed in specified portions of the conductive high polymer film.

A portion used as a capacitor element was individually cut off, and one capacitor element was prepared.

Then, taking out the cathode lead and anode lead, the individual capacitor elements were externally coated with an epoxy resin.

Thus, a solid electrolytic capacitor was completed.

In the embodiment, as required, plural independent negative electrodes can be used.

In the capacitor elements for solid electrolytic capacitor manufactured in this manner, the initial characteristics of electrostatic capacity, tangent of loss angle (dielectric loss tangent), leak current (10 V applied, 2 minutes), and withstand voltage (breakdown voltage of solid electrolytic capacitor by elevating voltage at a rate of 0.2 V/1 sec) were measured. Results of measurement are shown in Table 1.

Exemplary Embodiment 2

Instead of the manufacturing process of exemplary embodiment 1, the cathode lead-out part 4 measures 2 mm×2 mm. At the step of electrolytic polymerization, using the conductive tape 5 or polymerization electrode as the positive electrode and a single stainless steel plate as the cathode, a voltage was applied between the positive electrode and the cathode, and a conductive high polymer film was formed on the entire surface of the cathode lead-out part 4 in about 10 minutes. The other steps are same as in exemplary embodiment 1. Thus, capacitor elements for solid electrolytic capacitor of exemplary embodiment 2 were prepared. The initial characteristics of these capacitor elements are shown in Table 1.

COMPARATIVE EXAMPLE

Instead of exemplary embodiment 1, a conductive high polymer film was formed on the anodic oxidation film by chemical oxidation polymerization method using pyrrole. As the oxidizer in the chemical oxidation polymerization, ammonium persulfate was used. While causing the individual polymerization electrodes to contact with the surface of the conductive high polymer film formed in individual protrusions, electrolytic polymerization was performed in electrolytic polymerization solution, and a conductive high polymer film was formed on the surface of individual protrusions. That is, this example has not the step of using conductive tape. The example also has not the step of using band conductive tape. In this example, a conductive high polymer layer is formed on the surface of one protrusion by electrolytic polymerization, and a conductive high polymer layer is formed on the surface of other one protrusion by electrolytic polymerization, and this process is repeated. The electrolytic polymerization solution is composed of same components as in exemplary embodiment 1. Thus, a conductive high polymer film having the same composition as in exemplary embodiment 1 was formed on the conductive high polymer film formed by chemical oxidation polymerization. The other steps are same as in exemplary embodiment 1. Thus, capacitor elements for solid electrolytic capacitor of comparative example were, prepared. The initial characteristics of these capacitor elements are shown in Table 1.

TABLE 1

|  | Electrostatic capacity ($\mu$F) | Dielectric loss tangent (%) | Leak current ($\mu$A) | Withstand voltage (A) |
| --- | --- | --- | --- | --- |
| Exemplary embodiment 1 | 3.42 | 1.2 | 0.02 | 23.1 |
| Exemplary embodiment 2 | 1.08 | 1.1 | 0.01 | 22.6 |
| Comparative example | 3.54 | 1.6 | 2.4 | 16.0 |

In Table 1, the rating of exemplary embodiment 1 is 10 V, 3.3 $\mu$F, the rating of exemplary embodiment 2 is 10 V, 1.1 $\mu$F, and the rating of comparative example is 10 V, 3.3 $\mu$F.

As clear from this table, the capacitor elements for solid electrolytic capacitor of the exemplary embodiments are small in leak current and high in withstand voltage. Further, by forming a plurality of slits 23 at both sides of the band anode foil 1, a plurality of protrusions 24 are formed, and a conductive high polymer film is formed on the plurality of protrusions 24, so that a plurality of elements can be continuously manufactured by electrolytic polymerization. As a result, an excellent mass producibility is obtained.

Moreover, by using a conductive tape 5 as the polymerization electrode, in the method of forming the conductive high polymer film, as compared with the method not using the conductive tape in the comparative example, the conductive high polymer film can be formed easily on the plurality of protrusions. As a result, an excellent mass producibility is obtained.

In the exemplary embodiments 1 and 2, aluminum was used as the anode foil 1, but not limited to this, the anode foil may be also made of tantalum, titanium, or the like. The shape and dimensions of protrusions are not limited to the values of the illustrated embodiments alone. Manganese dioxide was used as the conductor layer, but not limited to this, other conductor layer having an electric conductivity may be used. Pyrrole was used as the material of electrolytic polymerization for forming conductive high polymer film, but thiophene, furan and their derivatives may be also used in the same manner as mentioned above. As the support electrolyte, alkyl naphthalene sulfonate was used, but not limited to this, other support electrolyte materials may be also used. The number of steps and sequence of steps are not limited to the exemplary embodiments alone, and other number of steps or sequence can be executed similarly.

Exemplary Embodiment 3

Figure 7:
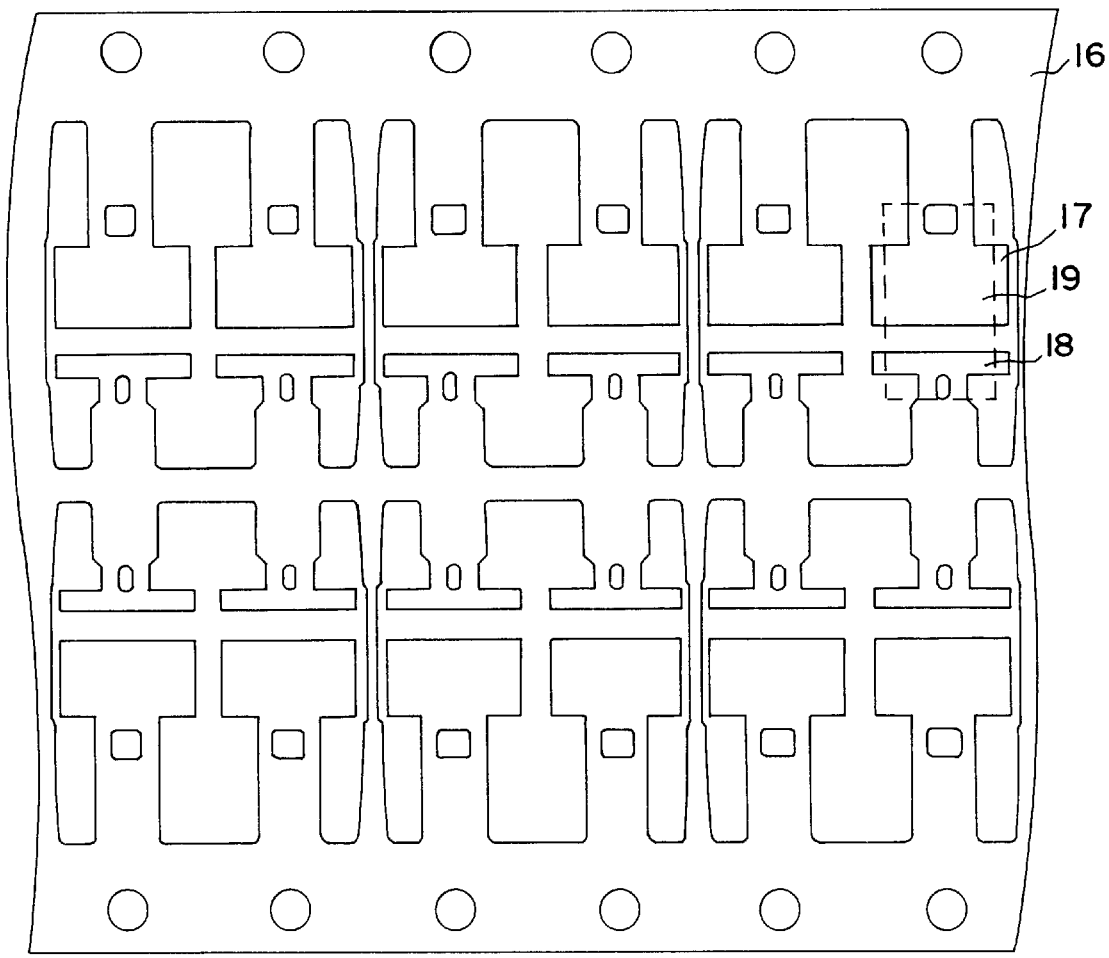
FIG. 7 is a partial plan view of a metal lead frame used in a step of assembling a solid electrolytic capacitor, in a manufacturing method of a solid electrolytic capacitor in an embodiment of the invention.
Figure 8:
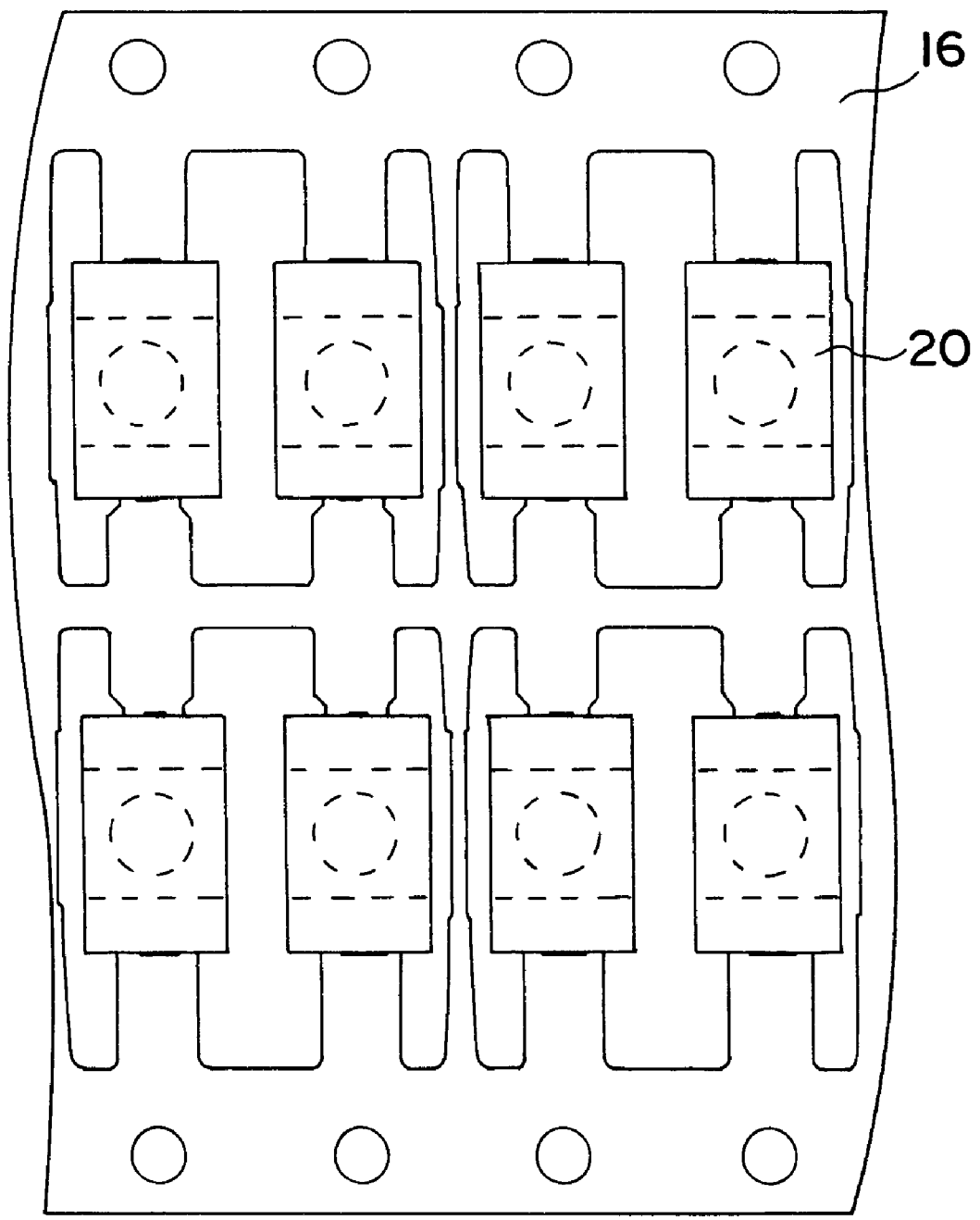
FIG. 8 is a partial plan view showing a solid electrolytic capacitor formed by molding an external resin on a metal lead frame, in a manufacturing method of a solid electrolytic capacitor in an embodiment of the invention.
Figure 10:
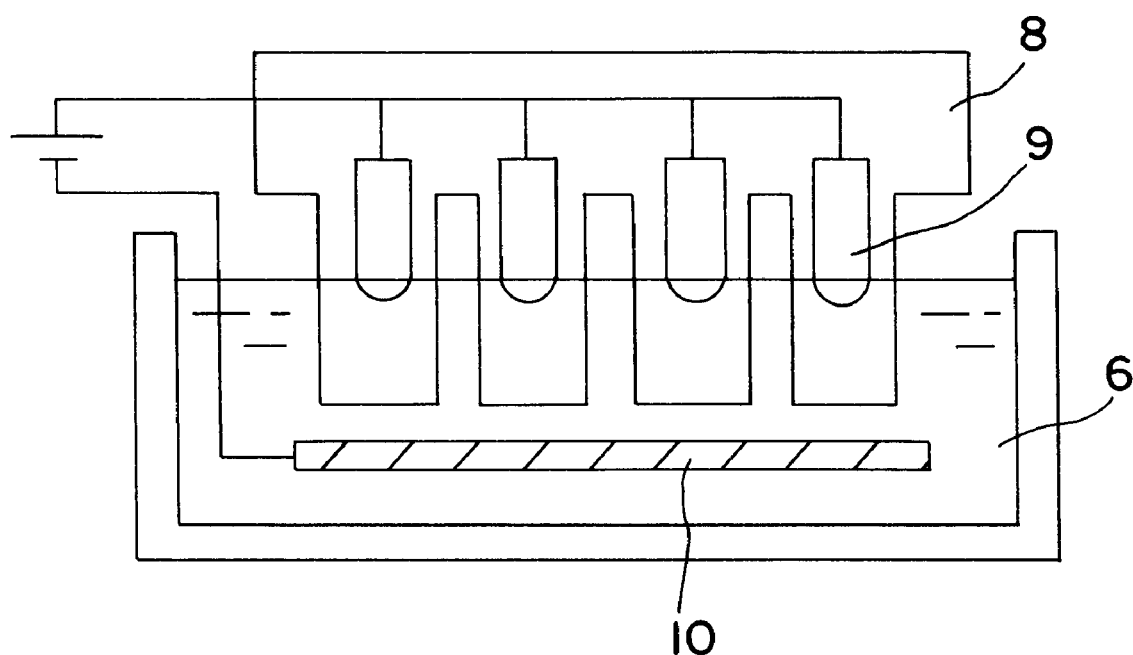
FIG. 10 is a schematic diagram showing a constitution of an electrolytic polymerization tank in a conventional manufacturing method of a solid electrolytic capacitor.

A different exemplary embodiment of the invention is described while referring to FIG. 7 and FIG. 8.

FIG. 7 shows a band metal lead frame 16 for assembling a product by using capacitor elements for solid electrolytic capacitor manufactured in exemplary embodiments 1 and 2. This metal lead frame 16 includes a plurality of element mounting parts 17, a plurality of anode terminals 18, and a plurality of cathode terminals 19. The plurality of element mounting parts 17 are formed at constant intervals. A plurality of capacitor elements are mounted on the individual element mounting parts 17. Individual anode terminals 18 and cathode terminals 19 are connected to the individual element mounting parts 17. The anode terminal 18 connects the anode of the capacitor element. The cathode terminal 19 connects the cathode of the capacitor element.

A plurality of capacitor elements are laminated and mounted on the element mounting parts 17 of thus constituted metal lead frame 16. Afterwards, the anode and cathode of the capacitor element are electrically connected to the anode terminal 18 and cathode terminal 19, respectively. The plurality of the capacitor elements are entirely and integrally covered with an external resin by molding. Thus, a solid electrolytic capacitor is formed.

FIG. 8 shows the state of the solid electrolytic capacitor after molding. In FIG. 8, a solid electrolytic capacitor 20 is integrally molded by an external resin.

The plurality of solid electrolytic capacitors 20 thus assembled are further processed in several steps as required. Later, the individual solid electrolytic capacitors are separated from the metal lead frame 16. Thus, individual solid electrolytic capacitors are obtained. In this method, a plurality of solid electrolytic capacitors are assembled continuously. Accordingly, the solid electrolytic capacitors having an excellent assembling precision and a high reliability are produced at a superior efficiency.

As clear from the exemplary embodiments, by the manufacturing method including a step of forming conductive high polymer films by electrolytic polymerization continuously on each protrusion of a plurality of protrusions by adhering an insulating tape to the band anode foil having the plurality of protrusions, a plurality of capacitor elements can be processed continuously from the forming treatment step to the electrolytic polymerization step, and the work is extremely easy. As a result, the mass producibility is notably improved. Further, solid electrolytic capacitors having excellent characteristics are obtained.

Still more, the conductive tape is adhered without touching the cathode lead-out part, and starting polymerization from this conductive tape, by applying a voltage through the conductor layer, electrolytic polymerization is performed, and therefore the anode foil is not injured and occurrence of defective part is prevented, thereby avoiding contact between defective part and the conductive high polymer film used as the cathode. As a result, a capacitor element for solid electrolytic capacitor having excellent characteristics such as small leak current, high withstand voltage and superior reliability is obtained.

Moreover, the process from the step of laminating a plurality of capacitor elements till the step of molding the plurality of laminated capacitor elements with resin is executed continuously by using a hoop metal lead frame in a terminal shape. Accordingly, solid electrolytic capacitors having an excellent assembling precision and a high reliability can be produced at a high efficiency.

What is claimed is:

1. A manufacturing method of solid electrolytic capacitor comprising the steps of:

(a) supplying a band metal having a central part in a width direction and a plurality of protrusions formed at an end part in said width direction, including,
  opening a plurality of holes at specified intervals in a longitudinal direction of said band metal, adhering an electric insulating tape to cover said plurality of holes, and said conductive tape is adhered on said electric insulating tape;

(b) forming a dielectric layer above a surface of said plurality of protrusions, (c) adhering a conductive tape to said central part, (d) forming a conductive polymer film above said plurality of protrusions, by performing electrolytic polymerization by starting polymerization from said conductive tape, (e) peeling said conductive tape from said metal, and (f) fabricating a plurality of capacitor elements by cutting off each protrusion of said plurality of protrusions, from said band metal forming said conductive polymer film.

2. The manufacturing method of solid electrolytic capacitor of claim 1, further comprising a step of placing a conductor layer above said dielectric layer, wherein said conductive polymer film is formed on said conductor layer.

3. The manufacturing method of solid electrolytic capacitor of claim 1, wherein said step of supplying the band metal includes a step of adhering an electric insulating film to said central part, forming an anode lead-out part at said central part side, and forming a cathode lead-out part in said protrusions, said anode lead-out part and cathode lead-out part are electrically insulated by said electric insulating tape, said conductive tape is adhered on said electric insulating tape, and said conductive polymer film is formed on said cathode lead-out part.

4. The manufacturing method of solid electrolytic capacitor of claim 1, wherein said step of forming the conductive polymer film includes a step of immersing said band metal to which said conductive tape is adhered in a polymerization solution, and while using said conductive tape as a positive electrode and using an electrode placed in said polymerization solution as a negative electrode, and performing electrolytic polymerization by applying a voltage between said positive electrode and negative electrode.

5. The manufacturing method of solid electrolytic capacitor of claim 1, wherein said band metal is made of a metal foil having a valve action.

6. The manufacturing method of solid electrolytic capacitor of claim 1, further comprising:

a step of laminating each capacitor element of said plurality of capacitor elements.

7. The manufacturing method of solid electrolytic capacitor of claim 1, further comprising the steps of:

laminating each capacitor element of said plurality of capacitor elements at a specified position of a band metal lead frame having a plurality of pairs of terminal parts, and fabricating individual solid electrolytic capacitors by cutting off said pair of terminal parts having said laminated capacitor elements, from said metal lead frame.

8. The manufacturing method of solid electrolytic capacitor of claim 1, further comprising the steps of:

laminating each capacitor element of said plurality of capacitor elements at a specified position of a band metal lead frame having a plurality of pairs of terminal parts, connecting each pair of terminals of said plurality of pairs of terminals electrically to the each anode lead-out part and each cathode lead-out part respectively, covering said laminated capacitor elements with an external resin, and fabricating individual solid electrolytic capacitors by cutting off said pair of terminal parts having said covered capacitor elements, from said metal lead frame.

9. The manufacturing method of solid electrolytic capacitor of claim 1, further comprising:

a conductor layer placed on said dielectric layer, wherein said step of forming the conductive polymer film includes a step of forming said conductive polymer film on said conductor layer by electrolytic polymerization, by using said conductive tape as a common positive electrode, and using the individual electrodes connected to independent power sources as independent negative electrode.

10. The manufacturing method of solid electrolytic capacitor of claim 1, wherein said step of forming the conductive polymer film includes a step of forming a polymer having at least one selected from the group consisting of pyrrole, thiophene, furan, and their derivatives, as unit of repetition.

11. The manufacturing method of solid electrolytic capacitor of claim 1, wherein said step (a), step (b), step (c), step (d), and step (e) are executed continuously.

12. A manufacturing method of solid electrolytic capacitor comprising the steps of:

(a) supplying a band metal having a central part in a width direction and a plurality of protrusions formed at an end part in said width direction, (b) forming a dielectric layer above a surface of said plurality of protrusions, (c) adhering a conductive tape to said central part, (d) forming a conductive polymer film above said plurality of protrusions, by performing electrolytic polymerization by starting polymerization from said conductive tape, (e) peeling said conductive tape from said metal, and (f) fabricating a plurality of capacitor elements by cutting off each protrusion of said plurality of protrusions, from said band metal forming said conductive polymer film, (g) placing a conductor layer above said dielectric layer, said conductive polymer film being formed on said conductor layer, (h) laminating each capacitor element of said plurality of capacitor elements at a specified position of a band metal lead frame having a plurality of pairs of terminal parts, (i) connecting each pair of terminals of said plurality of pairs of terminals electrically to the each anode lead-out part and each cathode lead-out part respectively, (j) covering said laminated capacitor elements with an external resin, and (k) fabricating individual solid electrolytic capacitors by cutting off said pair of terminal parts having said covered capacitor elements, from said metal lead frame, wherein said band metal is made of a metal having a valve action, said dielectric layer has an anodic forming film formed on a surface of said band metal, said step of supplying the band metal includes the steps of:
  opening a plurality of holes at specified intervals in the longitudinal direction of said band metal,
  adhering an electric insulating tape to cover said plurality of holes,
  adhering an electric insulating tape to said central part, forming an anode lead-out part at said central part side, and forming a cathode lead-out part on said protrusions, and
  forming a plurality of slits in said end part of said band metal, and forming said plurality of protrusions separated by said plurality of slits,
  said anode lead-out part and cathode lead-out part are electrically insulated by said electric insulating tape,
  said conductive tape is adhered on said electric insulating tape, and
  said conductive polymer film is formed on said cathode lead-out part.

13. A manufacturing method of solid electrolytic capacitor comprising,
  (a) supplying a band metal having a central part in a width direction and a plurality of protrusions formed at an end part in said width direction,
  (b) forming a dielectric layer above a surface of said plurality of protrusions,
  (c) adhering a conductive tape to said central part,
  (d) forming a conductive polymer film above said plurality of protrusions, by performing electrolytic polymerization by starting polymerization from said conductive tape,
  (e) peeling said conductive tape from said metal, and
  (f) fabricating a plurality of capacitor elements by cutting off each protrusion of said plurality of protrusions, from said band metal forming said conductive polymer film,
  wherein said conductive tape includes a base material made of at least one metal free from anodic oxidation property selected from stainless steel and nickel, and a adhesive material adhered to said base material, and
  said adhesive material is peeled from said band metal when the conductive tape is peeled from the band metal.

14. A manufacturing method of solid electrolytic capacitor comprising:
  (a) a first step of opening continuous holes at specified intervals, in a longitudinal direction of a continuous band anode foil made of valve metal,
  (b) after said first step, a second step of separating said band anode foil, so that an end part side in a width direction may be a cathode lead-out part and that a central part side may be an anode lead-out part, by adhering an electric insulating tape to face and back sides of said anode foil so as to cover said holes,
  (c) after said second step, a third step of forming a plurality of protrusions continuously by forming slits at specified intervals in the end part of said cathode lead-out part,
  (d) after said third step, a fourth step of forming an anodic forming film as a dielectric on the surface of said anode foil,
  (e) after said fourth step, a fifth step of adhering a conductor on the anodic forming film of said cathode lead-out part uniformly in at least one of insular state and layer state,
  (f) after said fifth step, a sixth step including adhering a conductive tape on said insulating tape, performing electrolytic polymerization by starting polymerization from said conductive tape, and forming a conductive polymer film in the cathode lead-out part through said conductor layer,
  (g) after said sixth step a seventh step including, peeling off said conductive tape, cutting off said band anode foil into individual pieces, and fabricating individual flat capacitor elements,
  (h) after said seventh step, an eighth step including laminating a plurality of said flat capacitor elements at specified positions of each terminal of a plurality of terminals provided at equal intervals in a band metal lead frame, and connecting the individual capacitor elements to said terminals electrically,
  (i) after said eighth step, a ninth step of covering said plurality of capacitor elements integrally with an external resin so that part of said terminals may be exposed outside, and
  (j) after said ninth step, a step of cutting off said covered elements into individual pieces and separating from the metal lead frame.

15. The manufacturing method of solid electrolytic capacitor of claim 14,
  wherein said sixth step of forming said conductive polymer film includes:
    a step of forming said conductive polymer film on said conductor layer by electrolytic polymerization, by using said conductive tape as a common positive electrode, and using each electrode connected to independent power sources as negative electrode.

16. A manufacturing apparatus of solid electrolytic capacitor comprising:
  (a) a band metal supply unit for supplying a band metal having a central part, and a plurality of protrusions formed at least at one side edge of both side edges positioned at both sides of said central part,
  (b) a dielectric forming unit for forming a dielectric layer on a surface of said plurality of protrusions,
  (c) a conductor forming unit for forming a conductor layer on said dielectric layer,
  (d) a conductive tape adhering unit for adhering a conductive tape to said central part,
  (e) an electrolytic polymerization unit for forming a conductive polymer film above said plurality of conductive layers, by performing electrolytic polymerization by starting polymerization from said conductive tape,
  (f) a conductive tape peeling unit for peeling said conductive tape from said metal,
  (g) an element cutting unit for fabricating a plurality of capacitor elements, by cutting off individual protrusions from said plurality of protrusions, from said band metal forming said conductive polymer film,
  wherein said band metal supply unit includes:
    a drilling unit for opening a plurality of holes at specified intervals in the longitudinal direction of said central part of said band metal, and
    an insulating tape adhering unit for adhering an electric insulating tape so as to cover said plurality of holes.

17. The manufacturing apparatus of solid electrolytic capacitor of claim 16,
  wherein said band metal supply unit includes a slit forming unit for forming a plurality of protrusions by forming a plurality of slits at specified intervals in the end, part in the width direction of said band metal.

18. The manufacturing apparatus of solid electrolytic capacitor of claim 16, wherein said dielectric layer forming unit includes a forming treatment unit for forming an anodic oxide film by forming treatment of said protrusions.

19. The manufacturing apparatus of solid electrolytic capacitor of claim 16, wherein said conductor layer forming unit includes:

an application unit for applying an aqueous solution of manganese nitrate on said dielectric layer, and a manganese dioxide forming unit for forming a manganese dioxide layer by pyrolysis of said applied aqueous solution of manganese nitrate.

20. The manufacturing apparatus of solid electrolytic capacitor of claim 16, wherein said band metal supply unit has a function of supplying an anode foil having a valve action.

21. The manufacturing apparatus of solid electrolytic capacitor of claim 16, further comprising:

a laminating unit for laminating each capacitor element of said plurality of capacitor elements.

22. The manufacturing apparatus of solid electrolytic capacitor of claim 16, further comprising:

a laminating unit for laminating individual capacitor elements of said plurality of capacitor elements at specified positions of a band metal lead frame having a plurality of pairs of terminal parts, and a product dividing unit for fabricating individual solid electrolytic capacitors by cutting off said pair of terminal parts having said laminated capacitor elements from said metal lead frame.

23. The manufacturing apparatus of solid electrolytic capacitor of claim 16, further comprising:

a laminating unit for laminating each capacitor element of said plurality of capacitor elements at specified positions of a band metal lead frame having a plurality of pairs of terminal parts, a connecting unit for connecting terminals of each pair of said plurality of pairs of terminals electrically to the capacitor elements, a forming unit for covering said laminated capacitor elements with an external resin, and a product dividing unit for fabricating individual solid electrolytic capacitors by cutting off said pair of terminal parts having said covered capacitor elements from said metal lead frame.

24. The manufacturing apparatus of solid electrolytic capacitor of claim 16, wherein said polymerization unit has a polymerization tank, a polymerization solution contained in said polymerization tank, and an electrode provided in said polymerization solution, and said polymerization unit has a function of polymerizing said conductive polymer film electrolytically, by using said conductive tape as a common positive electrode, using said electrode as a negative electrode, and applying a voltage between said positive electrode and said negative electrode.

25. The manufacturing apparatus of solid electrolytic capacitor of claim 16, wherein said polymerization unit has a polymerization tank, a polymerization solution contained in said polymerization tank and a plurality of stainless steel plates provided in said polymerization solution, said plurality of stainless steel plates are disposed at positions corresponding to said plurality of protrusions, and said polymerization unit has a function of polymerizing said conductive polymer film electrolytically, by using said conductive tape as a common positive electrode, using said plurality of stainless steel plates as negative electrode, and applying a voltage between said positive electrode and said negative electrode.

26. A manufacturing apparatus of solid electrolytic capacitor of comprising:

(a) a band metal supply unit for supplying a band metal having a central part, and a plurality of protrusions formed at least at one side edge of both side edges positioned at both sides of said central part, (b) a dielectric forming unit for forming a dielectric layer on a surface of said plurality of protrusions, (c) a conductor forming unit for forming a conductor layer on said dielectric layer, (d) a conductive tape adhering unit for adhering a conductive tape to said central part, (e) an electrolytic polymerization unit for forming a conductive polymer film above said plurality of conductive layers, by performing electrolytic polymerization by starting polymerization from said conductive tape, (f) a conductive tape peeling unit for peeling said conductive tape from said metal, (g) an element cutting unit for fabricating a plurality of capacitor elements, by cutting off individual protrusions from said plurality of protrusions, from said band metal forming said conductive polymer film, a laminating unit for laminating individual capacitor elements of said plurality of capacitor elements at specified positions of a band metal lead frame having a plurality of pairs of terminal parts, a connecting unit for connecting terminals of each pair of said plurality of pairs of terminals electrically to the capacitor elements, a forming unit for covering said laminated capacitor elements with an external resin, and a product dividing unit for fabricating individual solid electrolytic capacitors by cutting off said pair of terminal parts having said covered capacitor elements from said metal lead frame.

wherein said band metal is made of a metal having a valve action, said dielectric layer has an anodic forming film formed on the surface of said band metal, said band metal supply unit includes:

a drilling unit for opening a plurality of holes at specified intervals in the longitudinal direction of said band metal, an insulating tape adhering unit for adhering an electric insulating tape so as to cover said plurality of holes, and a slit forming unit for forming a plurality of slits at said end part edge of said band metal, and forming said plurality of protrusions separated by said plurality of slits, wherein said conductive tape is adhered on said electric insulating tape.

27. A manufacturing apparatus of solid electrolytic capacitor comprising:

a drilling unit for opening a plurality of holes continuously at specified intervals in the longitudinal direction of a continuous band anode foil made of a valve metal, an insulating tape adhering unit for adhering an insulating tape to face and back sides of said anode foil so as to cover said plurality of holes, a slit forming unit for forming slits at specified intervals in the end part in the width direction of said anode foil, a forming treatment unit for forming an anodic oxide film by forming treatment, on a cut section of the anode foil produced by forming said slits, a conductor layer forming unit for forming a manganese dioxide layer by applying an aqueous solution of manganese nitrate on the end part of said anode foil after said forming treatment, and performing pyrolysis, a conductive tape adhering unit for adhering a conductive tape on an insulating tape of an anode foil after forming said conductor layer, a polymerization unit for forming a conductive polymer film in the end part by immersing said anode foil to which said conductive tape is adhered in an polymerization solution, and polymerizing electrolytically, a conductive tape peeling unit for peeling said conductive tape from said anode foil after forming said conductive polymer film, an element dividing unit for obtaining flat capacitor elements by cutting off said anode foil from which said conductive tape is peeled into individual pieces, an element laminating unit for laminating and mounting a plurality of flat capacitor elements at specified positions of a plurality of terminals provided at equal intervals in said band metal lead frame, a connecting unit for connecting the electrode parts of said plurality of elements electrically to the terminals, a molding unit for covering the plurality of capacitor elements integrally with an external resin so that a part of said terminals may be exposed outside, and a product dividing unit for dividing the capacitor elements after molding into individual pieces.

28. The manufacturing apparatus of solid electrolytic capacitor of claim 27, wherein said polymerization unit has a function of polymerizing said conductive polymer film electrolytically, by using said conductive tape as a common positive electrode, using a plurality of independently disposed stainless steel plates as negative electrode, so as to be corresponding to said conductors formed in said individual cathode lead-out parts connected to independent power sources, and applying a voltage between said positive electrode and said negative electrode.

* * * * *